Oct. 7, 1924.
A. B. CADMAN
1,510,543
TRAILER TRUCK
Original Filed Feb. 28, 1920    2 Sheets-Sheet 1
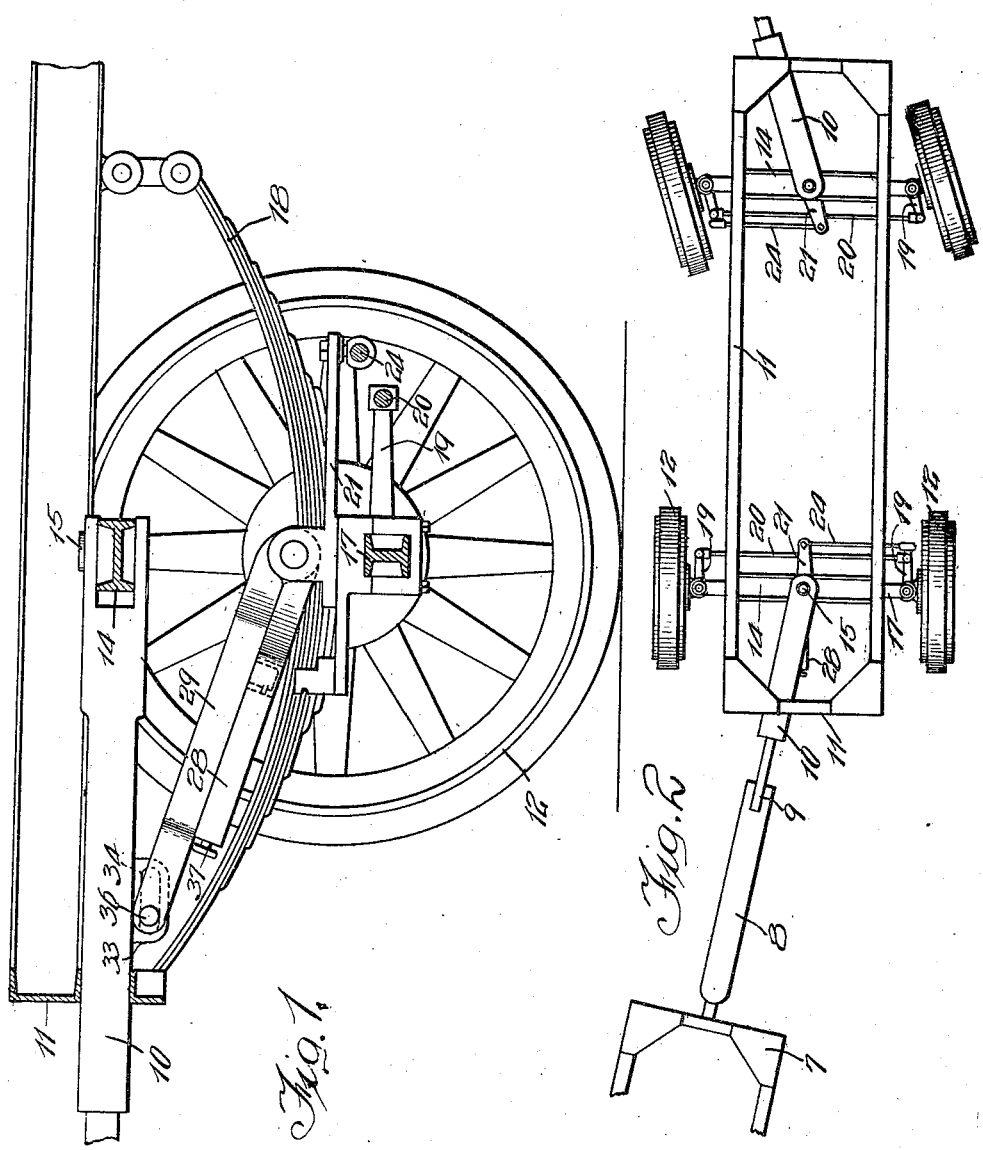
Witnesses:
W. F. Kilroy
Harry P. White
Inventor:
Addi Benjamin Cadman
By Miller Chindahl & Parker
Attys

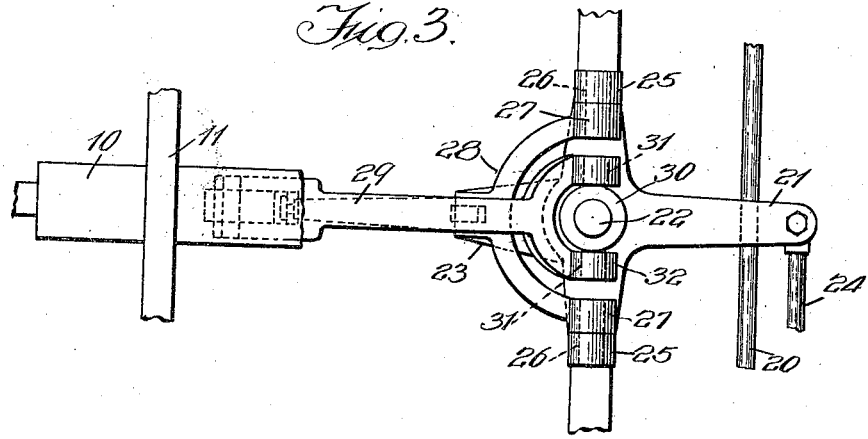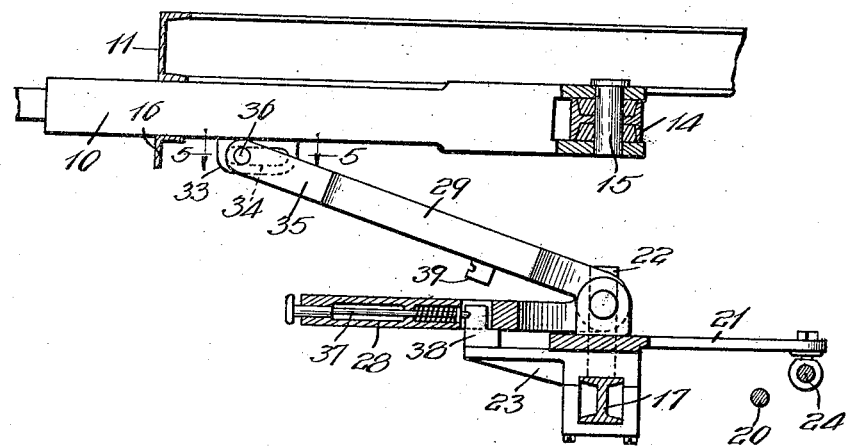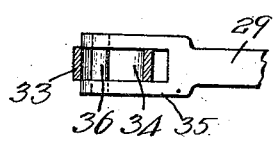

Patented Oct. 7, 1924.

1,510,543

UNITED STATES PATENT OFFICE.

ADDI BENJAMIN CADMAN, OF BELOIT, WISCONSIN, ASSIGNOR TO WARNER MANUFACTURING COMPANY, A CORPORATION OF WISCONSIN.

TRAILER TRUCK.

Application filed February 28, 1920, Serial No. 361,932. Renewed September 21, 1923.

*To all whom it may concern:*

Be it known that I, ADDI BENJAMIN CADMAN, a citizen of the United States, residing at Beloit, in the county of Rock and State of Wisconsin, have invented certain new and useful Improvements in Trailer Trucks, of which the following is a specification.

This invention relates to steering mechanism for a four-wheel trailer truck of the reversible type, that is to say, wherein the truck may be drawn and steered from either end, the front pair of wheels being attached to the draw bar to be steered thereby while the rear pair of wheels is locked in position parallel to the body frame of the truck.

In moving a trailer truck of this character into and out of positions to load and unload the same it is frequently necessary to back up the trailer and the drawing unit (usually a motor truck), and it may often be necessary to back from the street into an alley running at right angles thereto or even to back the motor truck and trailer through a sinuous path in order to get around other trucks, railroad cars, loading platforms, or other obstacles.

In order to obtain the maximum flexibility and to facilitate the operation under conditions such as described, it is desirable that the steering device which connects the draw bar to the wheels be capable of being disconnected so that the wheels may, at times, be locked in position parallel to the body frame or perpendicular to the axle, and may, at other times, be connected to the draw bar to be steered thereby, and may at still other times, be disconnected altogether so as to allow the wheels to be manually swung by the operator.

To facilitate an understanding of the purposes of such a construction it may be said that when the trailer is being drawn forwardly the front wheels are connected to the draw bar to be steered thereby while the rear wheels are locked in position parallel to the body frame. When the trailer is being backed, the front wheels, i. e., the wheels near the motor truck, are detached from the draw bar and locked in position parallel to the body frame so that they will run in a straight line, leaving the draw bar which is attached to the motor truck free to swing through its full arc without affecting these wheels. At the same time the rear pair of wheels (now the leading wheels in backing) are unlocked from their position parallel to the body frame so that they may be manually steered by the operator to lead the trailer and motor truck in the desired path.

It may frequently be necessary to stop backing and pull ahead a short distance to reposition the truck and trailer for further backing. When this is to be done, the rear wheels are again locked in position parallel to the body frame and the front wheels are unlocked from such parallel position and are connected to the draw bar so as to be steered by the latter in pulling ahead.

It will be apparent that at the end of the previous backing operation the front draw bar will frequently lie in angular position relative to the center line of the trailer so that it is impossible to connect the wheels to the draw bar without shifting the wheels around into alinement with the draw bar. It is an object of my invention to produce an improved construction which permits of unlocking the wheels from their position parallel to the body frame and manually swinging them into position parallel to the draw bar so that they may be connected to the latter preparatory to pulling ahead; also the reverse of this operation, that is to say, disconnecting the wheels from the draw bar and swinging them into position parallel to the body frame to be locked in such position preparatory to another backing up operation.

Another object of the invention is to provide an improved steering gear of simple and durable construction having a minimum number of joints adapted to accommodate itself to all of the conditions hereinbefore mentioned and many other conditions encountered in practical use so as to facilitate to the maximum degree the moving of a trailer and its tractor into and out of difficult positions.

Another object of the invention is to provide a steering gear adapted for use in a trailer wherein the draw bar is mounted on the body frame and said frame is supported upon the axles by springs and to arrange the steering gear so that the relative approaching and receding movements between the body frame and the axles will not affect the steering gear or change the positions or angularity of the wheels in any way.

A further object is to provide a trailer truck of the type just outlined in which the steering gear is mainly mounted on the axle and comprises a portion which extends upward for the connection to the draw bar; and in which the steering gear or a portion thereof may be detachably locked directly to the axle, so that the wheels may be held in position parallel to the body frame or may be allowed to be swung, as may be desired, either by the draw bar or manually by the operator independently of the draw bar.

In the accompanying drawings, Figure 1 is a sectional elevation illustrating one end of a trailer embodying my invention. Fig. 2 is a plan view showing a trailer connected with the rear portion of a motor truck or other tractor, and illustrating the operation of backing the trailer, the wheels adjacent to the motor truck being locked parallel to the frame, leaving the draw bar free to swing independently, while the rear wheels are connected to the draw bar to be manually steered by the operator.

Figs. 3 and 4 are enlarged fragmental detail views, in plan and sectional elevation, respectively, showing the parts of the steering gear.

Fig. 5 is a sectional detail view taken on line 5—5 of Fig. 4.

Referring to the drawings, 7 designates a drawing unit connected by means of a link 8 and coupling 9 with the sectional draw bar 10 of a trailer truck, comprising a frame 11 mounted upon wheels 12.

The coupling parts for connecting the drawing unit 7 with the trailer truck may be of any desired construction, but I prefer the coupling means shown in my prior Patent No. 1,245,676 issued November 6, 1917, to which reference may be had for details. The frame 11 of the truck has a cross bar 14 at each end to which the draw bar 10 is pivoted by means of a king-pin 15. The frame is also constructed at each end to provide a guideway 16 for the draw bar. 17 designates the axles of the truck between which and the frame springs 18 are interposed. The wheels 12 are provided with steering knuckles or arms 19 and each pair of these knuckles is connected to a single tie rod 20, which maintains the wheels in parallelism at all times. Inasmuch as the steering mechanisms at opposite ends of the trailer are substantially identical, the description of one only will suffice.

A steering lever 21 is mounted for pivotal movement upon a vertical king pin 22 (Figs. 3 and 4) which is carried by a bracket 23 rigidly secured to the mid-portion of the axle 17. The lever 21 in the present instance is of T-shape, one arm of the lever extending at right angles to the axle 17 and being connected by a drag link 24 to an extension on one of the steering arms 19 of the wheels, suitable joints such as ball and socket joints being employed at the ends of said drag link. The other arms of the lever 21, which are in alinement with each other and overlie the axle, have bearings 25 on their ends to receive pivot pins 26, which pins also extend into bearings 27 on the forked end of a manually operable lever 28 which projects from the axle toward the adjacent end of the frame. The pins 26 may be fixed in either pair of the bearings 25 or 27, being rotatable in the other bearings so as to permit of a swinging movement of the lever 28 up and down on said pins as an axis.

Also mounted on the king pin 22 to swing freely thereon is a lever 29, the mounting of the lever in the present instance comprising a collar 30 surrounding the king pin and having a pair of oppositely projecting pintles 31 which enter bearings 32 on the forked end of the lever 29 to allow rocking movement up and down of the lever on said pintles as an axis. The lever extends upwardly in an inclined position and is connected at its upper end to the draw bar 10 by a connection which permits of relative movement between the said lever and the draw bar so as to permit relative approaching and receding movements between the body frame and the axle due to deflection of the springs. The means for connecting the lever 29 and the draw bar in the present instance comprises a depending ear 33 on the draw bar having an elongated horizontal slot 34 therein, the upper end of the lever 29 having a fork 35 to embrace the ear 33 and carrying a pin 36 which passes through the slot 34. This form of connection, and the style of steering gear employed, permit of the movements of the frame and axle just mentioned due to spring deflection without in any way affecting the position or angularity of the wheels.

It will be noted that both the lever 21 and the lever 29 are mounted on the same king pin but are free to swing independently on said pin. The manually operated lever 28 is the controlling lever which determines the action of the wheels, said manually operating lever virtually forming a part of the lever 21 in the movements of said levers about the king pin 22 as an axis but being jointed to permit shifting of the manual lever up and down.

In order that the wheels may be locked in position at right angles to the axle (parallel to the body frame), or may be connected to the draw bar to be steered by the latter, or may be left free to be manually swung, I have provided for three distinct positions of the manual lever 28 in one of which positions, the lever is secured to the axle so that the wheels are firmly held at right angles to the axle, and in another of which positions the said manual lever is secured to the inclined steering lever 29 so that the wheels are thereby connected to the draw bar, and in the third of which positions the said manual lever is free from both the axle and the inclined steering lever so that the manual lever may be swung about the king pin 22 as an axis to change the position or angularity of the wheels. A spring detent 37 carried by the lever 28 is arranged to engage either in a lug 38 on the bracket 23 on the axle or in a lug 39 on the lever 29 so as to secure said lever 28 either to the axle or to the lever 29. Intermediate these two positions the detent will strike the edge of the lugs 38 and 39 so that the lever 28 will be kept free to be swung manually from side to side if desired. In order to give increased leverage, a supplemental lever (not shown) having a tubular end to be slipped over the end of the manual lever 28 may be employed, the supplemental lever extending beyond the end of the body frame so as to be freely accessible to the operator.

There is a considerable advantage in the construction heretofore described in being able to lock the wheels directly to the axle, in that this is the nearest point to the wheels and affords a short connection which is more rigid than would be possible if the steering device were locked to the body frame, for example, in holding the wheels against swinging.

My construction also permits of extreme simplification of parts and provides a strong durable construction having a minimum number of joints so as to minimize looseness or play in the steering gear.

While I have shown a preferred embodiment of my invention in the drawings and have described the same in considerable detail, I recognize that many modifications may be made without departing from the spirit and scope of the invention and therefore do not intend to limit the invention to the construction disclosed except as specified in the appended claims.

I claim as my invention:

1. A trailer truck having, in combination, a body frame, an axle having swiveled carrying wheels thereon, springs supporting said frame from said axle, a draw bar pivotally mounted on said frame, a tie rod connecting said wheels to maintain them in parallelism, a steering lever pivoted on a vertical axis on said axle, an inclined lever independently pivoted on the same axis as said steering lever and having its upper end attached to said draw bar, and a manual lever at all times connected with said steering lever to swing the latter, said manual lever being arranged to be secured at will either to said inclined lever or to a part rigid with said main axle.

2. A trailer truck having, in combination, a body frame, a main axle having swiveled carrying wheels thereon, springs supporting said frame from said axle, a drawbar pivotally mounted on said frame, two devices mounted on the axle, one of which devices is connected to the steering wheels and the other of which devices is connected to the drawbar, and means for optionally connecting said devices together or securing rigidly to the axle the device that is connected to the wheels.

3. A trailer truck having permanently mounted draft means, an axle equipped with dirigible wheels and means by which said wheels may be selectively connected to said draft means or locked to said axle, said means including a member vertically pivoted on said axle having a connection with said wheels, a member vertically pivoted on said axle having a connection with said draft means, and a member horizontally pivoted on said first mentioned member, having detachable connection selectively with said second mentioned member and with said axle.

4. A trailer truck having, in combination, an axle having dirigible wheels thereon, a body frame supported from said axle, a draw-bar pivotally mounted on said body frame, and means for steering said wheels comprising a three-part device one part of which is mounted on the said axle to turn on a vertical pivot and is connected to the wheels for swinging the latter, a second part of which is mounted on the same pivot with, but independent of, the first mentioned part, the second part having a longitudinally slidable connection with said draw-bar, and a third part which is horizontally pivoted on the first mentioned part to swing laterally therewith and adapted to be locked selectively in engagement with the second mentioned part or with the said axle.

5. A trailer truck having, in combination, a body frame, a draw-bar pivotally mounted thereon, an axle equipped with dirigible wheels, springs supporting said frame from said axle, a steering lever mounted on said axle pivoted on a vertical axis and connected with said wheels, an inclined lever mounted on said axle and pivoted concentrically with but in free relation to the steering lever, and having connecting means interengaging with a slotted lug dependent from said draw-bar, said connecting means being adapted to move in said slot with the deflection of said springs, and a manual lever pivoted on said steering lever adapted to swing laterally with the steering lever and vertically independently thereof, said manual lever having a locking device arranged to detachably engage with said inclined lever when the manual lever is in raised position whereby the steering lever is operated by the swinging of said draw-bar, and to detachably engage in rigid connection with said axle when the manual lever is in lowered position, whereby the steering lever is secured in a right angular position to the axle, in intermediate position said manual lever being capable of free lateral movement to swing the steering lever independently of the said draw-bar.

In testimony whereof, I have hereunto set my hand.

ADDI BENJAMIN CADMAN.